United States Patent Office 3,591,463
Patented July 6, 1971

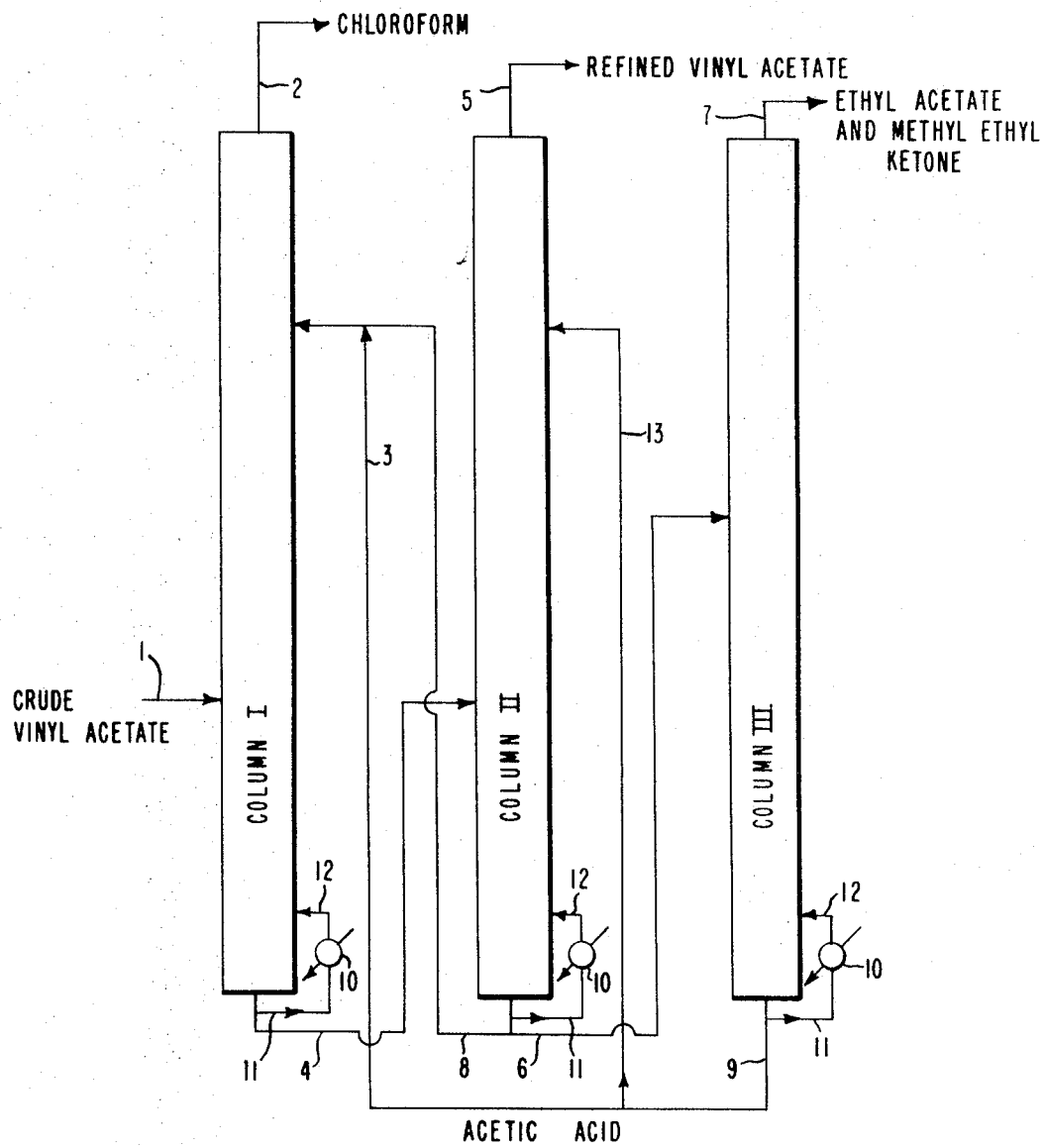

3,591,463
SEPARATION OF CHLOROFORM AND/OR ETHYL ACETATE AND/OR METHYLETHYL KETONE FROM VINYL ACETATE BY EXTRACTIVE DISTILLATION
Harry B. Copelin, Wilmington, Del., assignor to E. I. du Pont de Nemours and Company, Wilmington, Del.
Filed Oct. 25, 1968, Ser. No. 770,481
Int. Cl. B01d 3/34; C07c 67/06
U.S. Cl. 203—61
8 Claims

ABSTRACT OF THE DISCLOSURE

An extractive distillation method of separating chloroform, and/or ethyl acetate and/or methylethyl ketone from vinyl acetate, particularly when such materials are present as impurities in vinyl acetate. The method involves using a 2–10 carbon saturated aliphatic carboxylic acid as the extraction solvent. Acetic acid is an effective solvent for separating any or all three of such materials, while the other acids of the above type are effective solvents for separating ethyl acetate and/or methylethyl ketone.

BACKGROUND OF THE INVENTION

Chloroform, ethyl acetate and methylethyl ketone boil at temperatures sufficiently close to the boiling point of vinyl acetate as to make difficult the separation of any or all of such materials from vinyl acetate by simple fractional distillation methods. Their separation by such methods is particularly difficult when the chloroform, and/or ethyl acetate and/or methylethyl ketone are present at low concentrations, e.g., less than 2 weight percent, as impurities in the vinyl acetate.

In recent years, a number of attractive processes have been proposed for the production of vinyl acetate from ethylene. Robinson U.S. Pat. 3,190,912 describes one such process involving the vapor phase reaction of ethylene, acetic acid and oxygen in the presence of a palladium or palladium compound catalyst. British Pats. 964,001 and 95,551 describe a liquid phase process in which ethylene and oxygen are reacted with an acetic acid solution of a palladium compound catalyst, a metal acetate and a cupric salt oxidizing agent. The oxidizing agent, which becomes reduced during use, is in turn reoxidized by the oxygen, and such reoxidation may be effected in a single stage with oxygen supplied with the ethylene, or in a subsequent stage with oxygen supplied separately from the ethylene. The presence of chloride ions, e.g., supplied as a metal chloride is considered advantageous; however, McKeon et al. U.S. Pat. 3,221,045 describes a process of this type employing an essentially chloride-free system. Holtzrichter et al. U.S. Pat. 3,275,680 describes a process using a palladium metal catalyst which is contacted with ethylene, oxygen and acetic acid, preferably in the presence of a metal acetate.

In the above type processes, various by-products are obtained along with the vinyl acetate, and when the vinyl acetate is intended for use in polymerization reactions, as is usually the case, it is generally necessary that such by-products be separated completely from the vinyl acetate or be reduced to very low innocuous concentrations. Some such by-products, e.g., acetaldehyde and methyl acetate, can be readily separated from the vinyl acetate by simple fractional distillation methods. However, ethyl acetate, methylethyl ketone and chloroform do not fall in this category, and their separation from vinyl acetate produced by the above methods has constituted a real problem. Thus, crude vinyl acetate prepared by any of the above methods will generally contain small but objectionable amounts of ethyl acetate and methylethyl ketone as impurities. Furthermore, if the reaction to produce the vinyl acetate is carried out in the presence of a substantial concentration of chloride ions, the crude vinyl acetate product will usually also contain objectionable amounts of chloroform as an impurity.

The present invention provides a practicable extractive distillation method for separating ethyl acetate and/or methylethyl ketone and/or chloroform from vinyl acetate.

SUMMARY OF THE INVENTION

A process for separating vinyl acetate and a material which is at least one of the group consisting of chloroform, ethyl acetate and methylethyl ketone from a mixed stream containing vinyl acetate and such material, which process comprises subjecting the mixed stream to at least one extractive distillation (a) using as the extraction solvent acetic acid when such material is chloroform or includes chloroform, and (b) using as the extraction solvent any 2–10 carbon saturated aliphatic carboxylic acid when such material is ethyl acetate and/or methylethyl ketone.

DRAWING

The accompanying drawing is a diagram in a single figure showing schematically an extractive distillation system for practicing the method of the invention.

DETAILED DESCRIPTION AND PREFERRED EMBODIMENTS

This invention relates to a method of separating chloroform and/or ethyl acetate and/or methylethyl ketone from vinyl acetate, particularly when such materials are present as impurities in vinyl acetate. These materials boil at temperatures sufficiently close to the boiling point of vinyl acetate to make their separation from vinyl acetate by simple fractional distillation methods quite difficult, particularly when a highly purified vinyl acetate is desired.

Whether or not two liquids can be readily separated from each other by simple fractional distillation will depend upon their relative volatilities under equilibrium distillation conditions. Such relative volatilities are conventionally expressed in terms of the well-known "α values" (Perry, Chemical Engineers' Handbook, 3rd ed. (1950), page 579). The following α values were determined from equilibrium distillation data using an Othrmer still for 1% solutions of chloroform ($CHCl_3$), ethyl acetate (EtOAc) and methylethyl ketone (MEK) in vinyl acetate (VOAc):

$$\alpha \frac{CHCl_3}{VOAc} = 1.10 \qquad \alpha \frac{VOAc}{EtOAc} = 1.23 \qquad \alpha \frac{VOAc}{MEK} = 1.18$$

The above values, which are given in the conventional manner with the more volatile component in the numerator, are too close to unity (at unity, there would be no separation) to permit easy separation by simple fraction distillation. One well-known method for increasing the separability of liquids which are difficult to separate by simple fractional distillation methods is to employ an extractive distillation technique. In accordance with conventional extractive distillation practice, a mixed stream of the liquids to be separated is fed into the central or lower portion of a fractionating column while there is fed into the upper portion of the column an extraction solvent. The solvent must be one which will increase the difference in the volatilities of the liquids to be separated, i.e., will result in greater α value, so that the more volatile of the liquid or liquids to be separated will be removed as a substantially pure stream from the top of the column while the less volatile of the liquids to be separated together with the extraction solvent will be removed from the bottom of the column. The present invention is based upon the discovery of certain solvents which can be used in extractive distillation methods to improve the separability of chloroform, ethyl acetate and methylethyl ketone from vinyl acetate.

It has been found, in accordance with the invention, that chloroform, ethyl acetate and methylethyl ketone can each or all be separated from vinyl acetate by subjecting vinyl acetate containing such materials to extractive distillation using as the extraction solvent a 2–10 carbon saturated aliphatic carboxylic acid. Examples of such acids are acetic, propionic, isobutyric, n-butyric, pivalic and octanoic acids. Also effective are simple derivatives of such acids such as their monoalkoxy, monochloro and monoacyloxy derivatives. However, the simple hydrocarbo carboxylic acids are preferred.

Shown below are some $\alpha$ values obtained using Othmer still data for 1:1 weight mixtures of the carboxylic acids shown and crude vinyl acetate containing 1% by weight of chloroform, ethyl acetate or methylethyl ketone as impurities. These values show the effects of the acids upon the relative volatilities of vinyl acetate and the impurities.

| Solvent | $\alpha \dfrac{CHCl_3}{VAc}$ | $\alpha \dfrac{VAc}{EtOAc}$ | $\alpha \dfrac{VAc}{MEK}$ |
| --- | --- | --- | --- |
| None | 1.10 | 1.23 | 1.18 |
| Acetic acid | 1.35 | 1.52 | 1.64 |
| Propionic acid | 1.04 | 1.42 | 1.46 |
| Isobutyric acid | 1.04 | 1.43 | 1.48 |
| Pivalic acid | 1.05 | 1.39 | 1.42 |
| Methoxyacetic acid | 1.10 | 1.47 | 1.65 |
| Valeric acid | 1.03 | 1.38 | 1.43 |
| Octanoic acid | 0.95 | 1.36 | 1.36 |

An increase in the weight ratio of the extraction solvent:vinyl acetate does, in most instances, result in an increase in the $\alpha$ value and, therefore, in the effectiveness of separation when using such acid as the solvent in extractive distillation. The following data show the effect of the dilution of the crude vinyl acetate with increasing amounts of acetic acid:

| | $\alpha \dfrac{CHCl_3}{VAc}$ | $\alpha \dfrac{VAc}{EtOAc}$ | $\alpha \dfrac{VAc}{MEK}$ |
| --- | --- | --- | --- |
| Weight ratio of solvent to vinyl acetate: | | | |
| 0 | 1.10 | 1.23 | 1.18 |
| 1 | 1.35 | 1.52 | 1.68 |
| 2 | 1.49 | 1.63 | 1.89 |
| 3 | 1.58 | 1.69 | 2.06 |
| 5 | 1.85 | 1.75 | 3.00 |

As indicated previously, the crude vinyl acetate that is obtained from ethylene will generally include one or all of chloroform, ethyl acetate and methylethyl ketone, besides possibly other more readily separated impurities, depending upon the particular process employed in producing the vinyl acetate. Thus, in methods involving the production of vinyl acetate employing a system containing a relatively high concentration of chloride ion, substantial concentrations of all three of the above impurities will generally be found in the crude vinyl acetate products. On the other hand, if the production is effected at low chloride concentration or in the substantial absence of chloride ion, little or no chloroform may be present but ethyl acetate and methylethyl ketone generally will be present in the crude product.

It will be seen from the above $\alpha$ values that acetic acid is an effective extraction solvent for use in separating all three of the above impurities, whereas the other carboxylic acids beneficiate the separation of either ethyl acetate or methylethyl ketone or both, but not chloroform. When the crude vinyl acetate is devoid of any significant amount of chloroform, but does contain both ethyl acetate and methylethyl ketone, the latter two substances can be separated together as high boilers since it does not matter whether one or both are present. On the other hand, if all three of these substances are present and acetic acid is employed as the extraction solvent, then the use of three still columns in series is desirable, the first of which would separate the chloroform impurity as overhead product, the second of which would separate refined vinyl acetate as overhead product, and the third of which would separate the ethyl acetate and methylethyl ketone impurities as overhead product. The bottom product from the third column would be acetic acid which normally would be recycled as the extraction solvent to the first and second columns. The first of these columns would be omitted when the crude vinyl acetate is devoid of chloroform but does contain ethyl acetate and/or methylethyl ketone.

The drawing shows schematically a three-column extractive distillation system which can be effectively used to practice the method of the invention. If the vinyl acetate to be purified includes significant concentrations of all three of the above impurities, i.e., chloroform, ethyl acetate and methylethyl ketone, all three of the distillation columns shown would be employed, assuming that the acetic acid used as the extraction solvent is to be recovered and recycled for reuse. As shown in the drawing, the crude vinyl acetate containing the impurities would be fed via line 1 to Column I in the central or lower region thereof whereas acetic acid would be fed to the upper portion of the column via line 3. A chloroform concentrate containing minor amounts of vinyl acetate and acetic acid would be removed as overhead product from that column via line 2. The bottom stream from Column I comprising acetic acid, most of the vinyl acetate and the ethyl acetate and methylethyl ketone impurities, would be removed as bottom product via line 4 which feeds to the central or lower section of Column II. Acetic acid would also be fed to the upper portion of Column II via line 13. The overhead product from Column II would be the refined vinyl acetate taken off via line 5, whereas the bottom product from that column comprising a solution of the ethyl acetate and methylethyl ketone impurities in acetic acid is fed via line 6 to about the central portion of Column III. Column III functions simply to fractionate the feed thereto yielding an overhead product comprising the ethyl acetate and methylethyl ketone impurities taken off via line 7 and a bottom product consisting essentially of acetic acid. The latter product normally would be fed via lines 9 and 3 to the top of Column I and/or via lines 9 and 13 to the top of Column II, depending upon whether a two or three column system is to be used. Instead of being fed to the tops of Columns I and II, the acetic acid recovered as bottom product from Column III can be discarded or used in any desired manner and fresh acetic acid can be fed to the tops of Columns I and II. Obviously, the reuse of acetic acid recovered from Column III as the extraction solvent feeds to Columns I and II would normally be practiced.

Each of Columns I, II and III of the drawing is shown provided with a reboiler section consisting of line 11 for feeding part of the column bottom effluent to a steam heated boiler 10 and a return line 12. Each of the columns shown would be a packed column or a plate column of the kind generally employed for effecting fractional distillations, and each would be provided with conventional means (now shown in the drawing) for returning part of the overhead flow as column reflux. If the extraction solvent, e.g., acetic acid, is not to be recovered and recycled, Column III can be omitted and the bottom effluent from Column II consisting of an acetic acid solution of ethyl acetate and/or methylethyl ketone can simply be discarded via line 6 or employed as acetic acid feed to the reactor in which the vinyl acetate is produced. Alternatively, the bottom effluent from Column II will be fed to Column III as indicated for the recovery of the acetic acid solvent for reuse. Also alternatively, part of the bottom effluent from Column II can be recycled via line 8 and line 3 to the top of Column I to provide part of the acetic acid requirements for Column I. This reduces the load on the acetic acid recovery Column III.

If the crude vinyl acetate to be purified is essentially free of chloroform but does contain either ethyl acetate or methylethyl ketone, or both, the use of Column I as shown in the drawing would be dispensed with and the crude vinyl acetate would be fed directly, e.g., via line 4, to Column II. In this case, the extraction solvent can be any of the 2–10 carbon carboxylic acids indicated above.

To illustrate the difficulty of separating chloroform, ethyl acetate and methylethyl ketone from vinyl acetate in which they were present as impurities, a two-still arrangement was employed in which the crude vinyl acetate containing the impurities was fed continuously to the middle of the first still which consisted of a 20-inch upper section and a 36-inch lower section. The lights product was removed from the top of this still while the major portion of the vinyl acetate was removed from the bottom. The bottom stream from the first still was then passed to the middle of the second still which consisted of a 36-inch upper section and a 12-inch lower section. The product vinyl acetate fraction was taken off as overhead from the second column while the bottom fraction from the second column contained the heavier fractions. The columns of both stills had an inside diameter of 1 inch and were packed with perforated stainless steel saddles. The conditions under which the two stills were operated were as follows:

STILL I—LIGHTS COLUMN

Reflux ratio—20:1
Boilup rate—680 gm./hr.
Overhead rate—34 gm./hr.
Feed rate—354 gm./hr.
Bottoms rate—320 gm./hr.

STILL II—HEAVIES COLUMN

Reflux ratio—2:1
Boilup rate—636 gm./hr.
Feed rate—320 gm./hr.
Overhead rate—212 gm./hr.
Bottoms rate—108 gm./hr.

Such a direct distillation for separating the above impurities from vinyl acetate was quite inefficient as will be evident from the following data showing the impurity contents of the vinyl acetate feed and the vinyl acetate overhead product stream from the second still:

|  | Percent | | |
| --- | --- | --- | --- |
|  | $CHCl_3$ | EtOAc | MEK |
| VOAc feed | 1.08 | 0.63 | 0.11 |
| VOAc product | 0.90 | 0.23 | 0.05 |

The superior and much easier separation when carried out under extractive distillation conditions employing an extraction acid solvent in accordance with the invention is illustrated by the following examples, in which all percentage compositions are by weight.

EXAMPLE 1

In this example, a single still packed with perforated stainless steel saddles was employed. It consisted of a 36-inch bottom section and a 10-inch top section, each of which had an inside diameter of 1 inch. There was continuously fed to the still between the two sections a vinyl acetate stream containing 0.2% chloroform and an acetic acid stream, the conditions for carrying out the distillation being as follows:

Reflux ratio—2.5:1
Boilup rate—618 gm./hr.
Vinyl acetate feed rate—383 gm./hr.
Acetic acid feed rate—766 gm./hr.
Bottoms rate (total)—943 gm./hr.
Overhead rate—206 gm./hr.

The overhead stream consisted of a chloroform concentrate while the bottom product consisted essentially of vinyl acetate and acetic acid. Whereas the crude vinyl acetate fed contained 0.2% chloroform, the chloroform concentration in the bottom product stream was only 0.014%, based on the vinyl acetate present.

EXAMPLE 2

The procedure of Example 1 was repeated except for the conditions of operation which were as follows:

Reflux ratio—2.5:1
Boilup rate—435 gm./hr.
Vinyl acetate feed rate—236 gm./hr.
Acetic acid feed rate—946 gm./hr.
Bottoms rate (total)—1037 gm./hr.
Overhead rate—145 gm./hr.

In this case, whereas the chloroform content of the vinyl acetate fed was 0.2%, the chloroform content of the bottom product, based on the vinyl acetate, was only 0.0075%.

Examples 1 and 2 illustrate the operation of the exhausting or bottom section of Column I of the drawing.

EXAMPLE 3

Using the still system of Example 1, the vinyl acetate feed stream was fed to the still boiler and the acetic acid feed stream was fed between the two column sections as in Example 1. In this instance, however, the vinyl acetate fed was free of chloroform but contained 0.2% each of ethyl acetate and methylethyl ketone. The distillation was carried out under the following conditions:

Reflux ratio—2:1
Boilup rate—456 gm./hr.
Vinyl acetate feed rate—576 gm./hr.
Acetic acid rate—1250 gm./hr.
Overhead rate (product)—152 gm./hr.

The overhead product consisted of vinyl acetate containing less than 0.005% each of ethyl acetate and methylethyl ketone, whereas the bottom product consisted mostly of acetic acid with the major portion of the ethyl acetate and methylethyl ketone impurities.

EXAMPLE 4

The procedure of Example 3 was repeated except under the following distillation conditions:

Reflux ratio—2:1
Boilup rate—576 gm./hr.
Vinyl acetate feed rate—324 gm./hr.
Acetic acid rate—1250 gm./hr.
Overhead rate (product)—192 gm./hr.

Whereas the vinyl acetate fed contained 0.2% each of ethyl acetate and methylethyl ketone, the overhead vinyl acetate fraction contained, respectively, only 0.01% ethyl acetate and less than 0.005% methylethyl ketone.

Examples 3 and 4 illustrate the operation of the upper section of Column II of the drawing.

EXAMPLE 5

A 130 plate distillation column 3 inches in diameter was employed. Crude vinyl acetate was fed to the 20th plate at a rate of 3.63 lbs. per hour while a stream of acetic acid was fed to the 110th plate at a rate of 7.66 lbs. per hour while holding the boilup in the column constant at 23.7 lbs. per hour. Vapor from the column was taken overhead to an external condenser and passed to a Rotameter before being returned to the column as reflux. A small purge, equivalent to 2.32% of the vinyl acetate fed, was taken periodically from the overhead line to remove chloroform impurities from the system. The bottom effluent from the column consisted mainly of vinyl acetate and acetic acid.

The system was operated for a period of 26.5 hours employing a vinyl acetate feed containing 0.59% chloroform, 0.23% ethyl acetate and 0.08% methylethyl ketone. The bottom product from the column contained 24.9% vinyl acetate, 74.7% acetic acid, 0.03% chloroform, 0.11% ethyl acetate and 0.07% methylethyl ketone, the percentages of chloroform, ethyl acetate and methylethyl ketone being based on the weight of vinyl acetate in the bottom product.

EXAMPLE 6

The procedure of Example 5 was repeated for a period of 12 hours except that the acetic acid fed to the column was increased to 20.38 lbs. per hour, and the crude vinyl acetate feed contained 0.74% chloroform, 0.24% ethyl acetate and 0.1% methylethyl ketone. In this case, the bottom product from the column contained 11.88% vinyl acetate, 87.6% acetic acid, 0.13% chloroform, 0.08% ethyl acetate and 0.05% methylethyl ketone, the chloroform, ethyl acetate and methylethyl ketone contents being based upon the vinyl acetate content.

EXAMPLE 7

In this distillation, the same 130 plate distillation column of Example 5 was used. In this instance, however, the vinyl acetate feed, which was fed to the 30th plate, was the bottom product obtained from a distillation operation similar to that of Example 5. The acetic acid solvent was fed to the 110th plate. The vinyl acetate was fed at a rate of 6.03 lbs. per hour while the acetic acid was fed at a rate of 1.66 lbs. per hour. The boilup rate was about 8.2 lbs. per hour, and such as to control the temperature at the 20th plate at 100–115° C. The reflux ratio was 7:1. The vinyl acetate feed contained 35.65% vinyl acetate, 63.6% acetic acid, 0.03% chloroform, 0.14% ethyl acetate and 0.09% methylethyl ketone, the contents of the latter three materials being based on the vinyl acetate. The bottom product from the column contained 0.22% vinyl acetate, 98.53% acetic acid, 0.06% ethyl acetate and 0.06% methylethyl ketone. The overhead refined vinyl acetate product contained 0.03% chloroform, less than 0.005% ethyl acetate and less than 0.05% methylethyl ketone.

Examples 5 and 6 show the effective separation of chloroform impurity as overhead product in an extractive distillation using acetic acid as the extraction solvent to obtain a relatively chloroform-free bottom product composed mainly of vinyl acetate and acetic acid but including the ethyl acetate and methylethyl ketone impurities originally present in the crude vinyl acetate. Example 7 shows the use of acetic acid as extraction solvent to separate effectively from bottom product of the type obtained in Examples 5 and 6, the ethyl acetate and methylethyl ketone impurities. The refined overhead vinyl acetate product obtained in Example 7 was relatively free from chloroform as well as ethyl acetate and methylethyl ketone. The operations illustrated in Examples 5 and 6 represent the operations that would be effected in Column I of the accompanying drawing whereas the operation illustrated in Example 7 is representative of the kind of operation that would be effected in Column II of the drawing. Obviously, if the acetic acid content of the bottom effluent from Example 7 were to be employed as the extraction solvent in the operations of either Column I or II or both of the drawing, a fractionation of such bottom effluent could readily be carried out in a fractionation column such as Column III of the drawing.

I claim:
1. A process for separating vinyl acetate and a material which is at least one of the group consisting of chloroform, ethyl acetate and methylethyl ketone from a mixed stream containing vinyl acetate and said material, which process comprises subjecting said mixed streams to at least one extractive distillation (a) using as the extraction solvent acetic acid when said material includes chloroform, and (b) using as the extraction solvent any 2–10 carbon saturated aliphatic carboxylic acid when said material does not include chloroform.
2. The process of claim 1 wherein the extraction solvent is acetic acid.
3. The process of claim 1 wherein said material is chloroform and said extraction solvent is acetic acid; and wherein the extractive distillation is effected in a column from the top of which is removed a chloroform stream and from the bottom of which is removed a stream of a mixture of vinyl acetate and acetic acid.
4. The process of claim 1 wherein said material is ethyl acetate and/or methylethyl ketone and said extraction solvent is acetic acid; and wherein the extractive distillation is effected in a column from the top of which is removed a vinyl acetate stream and from the bottom of which is removed a stream of a mixture of acetic acid and ethyl acetate and/or methylethyl ketone.
5. The process of claim 1 wherein said material is chloroform, ethyl acetate and/or methylethyl ketone, and said extraction solvent is acetic acid; and wherein: (a) said mixed stream is subjected to an extractive distillation in a first column from the top of which is removed a chloroform stream and from the bottom of which is removed a stream of a mixture of vinyl acetate, acetic acid, and ethyl acetate and/or methylethyl ketone; and (b) said stream from the bottom is subjected to an extractive distillation in a second column from the top of which is removed a vinyl acetate stream and from the bottom of which is removed a stream of a mixture of acetic acid and ethyl acetate and/or methylethyl ketone.
6. The process of claim 3 wherein the stream removed from the bottom of the column is fractionally distilled to recover vinyl acetate therefrom.
7. The process of claim 4 wherein the stream removed from the bottom of the column is fractionally distilled to recover acetic acid therefrom.
8. The process of claim 5 wherein the stream removed from the bottom of the second column is fractionally distilled to recover acetic acid therefrom.

References Cited
UNITED STATES PATENTS

| | | | |
|---|---|---|---|
| 3,228,985 | 1/1966 | Carpenter et al. | 260—499 |
| 3,277,158 | 1/1966 | Schaeffer | 260—497 |
| 3,404,186 | 10/1968 | Bailey et al. | 260—499 |
| 3,415,872 | 10/1968 | Karnofsky | 260—499 |
| 3,438,870 | 4/1969 | Roscher et al. | 260—497 |
| 3,458,406 | 7/1969 | Fisher et al. | 260—497 |

WILBUR L. BASCOMB, JR., Primary Examiner

U.S. Cl. X.R.

203—71; 260—497, 499